(12) United States Patent
Li et al.

(10) Patent No.: US 10,511,705 B2
(45) Date of Patent: Dec. 17, 2019

(54) METHOD, SYSTEM, AND DEVICE FOR NETWORK CONTROL

(71) Applicant: Alibaba Group Holding Limited, George Town (KY)

(72) Inventors: Liang Li, Hangzhou (CN); Yongling Xue, Hangzhou (CN); Zhaoyu Chen, Hangzhou (CN); Junfei Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 16/007,160

(22) Filed: Jun. 13, 2018

(65) Prior Publication Data

US 2019/0045048 A1 Feb. 7, 2019

(30) Foreign Application Priority Data

Jun. 16, 2017 (CN) .......................... 2017 1 0459379

(51) Int. Cl.
| | |
|---|---|
| *H04L 29/08* | (2006.01) |
| *H04M 1/725* | (2006.01) |
| *H04L 12/815* | (2013.01) |
| *H04L 29/06* | (2006.01) |
| *H04L 12/801* | (2013.01) |
| *G06F 15/173* | (2006.01) |
| *H04L 12/24* | (2006.01) |
| *H04L 12/58* | (2006.01) |

(52) U.S. Cl.
CPC ...... *H04M 1/72577* (2013.01); *G06F 15/173* (2013.01); *H04L 41/08* (2013.01); *H04L 47/12* (2013.01); *H04L 47/22* (2013.01); *H04L 63/0272* (2013.01); *H04L 67/2819* (2013.01); *H04L 51/12* (2013.01)

(58) Field of Classification Search
CPC .............. H04M 1/72577; H04L 41/08; H04L 67/2819; H04L 63/0272; H04L 47/12; H04L 47/22; H04L 51/12; G06F 15/173
See application file for complete search history.

(56) References Cited

U.S. PATENT DOCUMENTS

| | | | |
|---|---|---|---|
| 7,996,045 B1 | 8/2011 | Bauer | |
| 8,578,443 B2 | 11/2013 | Narain | |
| 9,213,850 B2 | 12/2015 | Barton | |
| 9,894,099 B1 | 2/2018 | Jacobsen | |
| 2003/0032429 A1 | 2/2003 | MacRidis | |
| 2006/0225107 A1 | 10/2006 | Seetharaman | |
| 2008/0066148 A1 | 3/2008 | Lim | |
| 2012/0122448 A1 | 5/2012 | Mueck | |
| 2014/0226571 A1* | 8/2014 | Das | H04L 41/0896 370/329 |
| 2015/0188949 A1 | 7/2015 | Mahaffey et al. | |

(Continued)

*Primary Examiner* — Hashim S Bhatti
(74) *Attorney, Agent, or Firm* — Van Pelt, Yi & James LLP

(57) ABSTRACT

Embodiments of the present application relate to a method, device, and system for network control. The method includes determining, by one or more processors, whether a target application is running in a foreground of a terminal, the target application being included in a set of target applications, and in response to determining that the target application is running in the foreground, blocking or throttling, by the one or more processors, network communication for at least one application not included in the set of target applications.

18 Claims, 6 Drawing Sheets

(56) References Cited

U.S. PATENT DOCUMENTS

2016/0007233 A1\* 1/2016 Rao .................. H04W 72/1242
  455/452.2
2016/0164801 A1\* 6/2016 Jain ..................... H04L 65/4084
  709/226
2016/0210578 A1\* 7/2016 Raleigh ............ G06Q 10/06375

\* cited by examiner

METHOD, SYSTEM, AND DEVICE FOR NETWORK CONTROL

CROSS REFERENCE TO OTHER APPLICATIONS

This application claims priority to People's Republic of China Patent Application No. 201710459379.6 entitled A NETWORK CONTROL METHOD AND MEANS filed Jun. 16, 2017, which is incorporated herein by reference for all purposes.

FIELD OF THE INVENTION

The present application relates to a field of communication technology. In particular, the present application relates to a method, system, and device for network control.

BACKGROUND OF THE INVENTION

A user of a terminal (such as a mobile phone or a tablet computer) may have a poor experience when performing application operations due to the consumption of network resources (e.g., bandwidth) by several applications running on the terminal. For example, performance of a terminal can depend on a number of applications being executed at one time. In some cases, if more than one additional application is open when a user is playing a combat game on a terminal such as a mobile phone, the multiple open applications will consume bandwidth of the connection between the terminal and the mobile phone. Accordingly, the Internet connection speed experienced by any one of the applications being executed can be negatively impacted and thus the execution of a plurality of applications while the user is playing the combat game can cause the connection speed of the combat game to close. The user's experience suffers as a result. Moreover, the mobile phone may receive message alerts from instant messaging applications while the combat game is being played, and such applications can also detract from the user's experience.

Therefore, a method, device, smart terminal, and system for improving a connection speed of a particular application being executed are desired.

BRIEF DESCRIPTION OF THE DRAWINGS

Various embodiments of the invention are disclosed in the following detailed description and the accompanying drawings.

DETAILED DESCRIPTION

Figure 1:
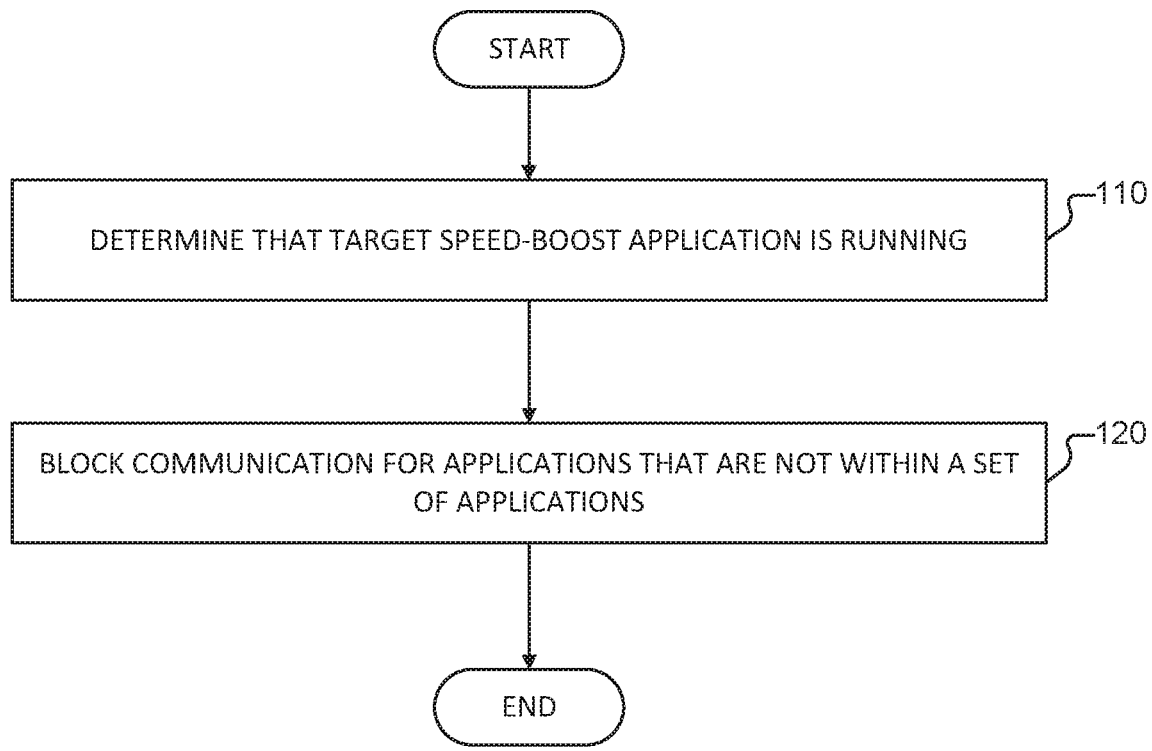
FIG. 1 is a flowchart of a method for network control according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The following is a detailed explanation of embodiments of the present application in light of the drawings. The embodiments described below serve only to explain and interpret the present application and do not limit the present application.

Please understand that the embodiments of the present application and the various features within the embodiments may be combined if they do not conflict and will in all such cases remain within the protective scope of the present application. In addition, although the flowchart depicts a logical sequence, the steps that are shown or described may be executed according to a different sequence.

In some embodiments, a computing device that executes the network control method comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium. Memory may comprise module 1, module 2, . . . , module N (being an integer greater than 2).

Computer-readable media include permanent, non-permanent, mobile, and non-mobile media. Storage media may store information by any method or technique. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media do not include non-transient computer-readable media (transitory media) such as modulated data signals and carrier waves.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, tvOS, and Windows can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

According to various embodiments, communication for a set of applications being executed is controlled. For example, a first set of applications can be determined to have priority over a second set of applications with respect to network communications. In response to determining that a particular application or a particular type of application is being run in the foreground (e.g., currently being used by the user, or being actively used by the user), network communication for one or more other applications can be controlled.

FIG. 1 is a flowchart of a method for network control according to various embodiments of the present application.

Referring to FIG. 1, process 100 for network control is provided. Process 100 can be implemented in connection with virtual private network (VPN) 200 of FIG. 2. Process 100 can be implemented in connection with process 300 of FIG. 3, process 400 of FIG. 4, and/or process 500 of FIG. 5. Process 100 can be implemented by computer system 600 of FIG. 6.

At 110, a terminal determines whether a target speed-boost application is running. In some embodiments, the terminal determines whether a target speed-boost application is running in the foreground. The operating system of the terminal can determine the one or more applications running in the foreground of the terminal. The one or more applications running in the foreground of the terminal can be determined based at least in part on an Application Programming Interface (API) checking a status. For example, for a terminal running an Android operating system, one or more applications running in the foreground of the terminal can be determined based on android.permission.PACKAGE_USAGE_STATS. In some embodiments, an application determines whether an application is a target speed-boost application. In some embodiments, the operating system of the terminal determines whether an application is a target speed-boost application.

As an example, an application running in the foreground corresponds to an application that is being displayed (e.g., in a foreground) on a user interface of the terminal. As another example, an application running in the foreground corresponds to an application that is active such as an application that is being used by a user of the terminal. An active application can comprise an application that is selected or in which an input is submitted by a user of the terminal. As another example, an application running in the foreground corresponds to an application that is currently being used by the user. As another example, an application running in the foreground corresponds to an application that is being actively used by the user.

In some embodiments, a target speed-boost application corresponds to an application that requires a large amount of network communication bandwidth in order to provide a certain Quality of Service to a user. For example, a target speed-boost application can consume a network communication bandwidth that exceeds a predefined threshold. As another example, a target speed-boost can have a minimum targeted network communication bandwidth. The minimum targeted network communication bandwidth can correspond to network communication bandwidth with which the corresponding target speed-boost application will operate as desired. For example, the minimum targeted network communication bandwidth can be configured according to user settings or preferences. As another example, the minimum targeted network communication bandwidth can be pre-defined by a developer of the application.

In some embodiments, a terminal stores a mapping of applications to target speed-boost applications. The mapping of applications to target speed-boost applications can identify applications installed on the terminal that correspond to target speed-boost applications. As an example, the mapping of applications to target speed-boost applications can be configured by a user (e.g., according to user preferences or user settings). As another example, the mapping of applications to target speed-boost applications can be configured based on an indicator associated with an application installed on the terminal. The indicator can also be referred to herein as the target speed-boost indicator. The indicator can be set according to whether the corresponding application is a target speed-boost application. As an example, the indicator can be set by the user (e.g., according to user preferences or user settings). As another example, the indicator can be set by the developer of the application. In some embodiments, the indicator corresponds to the application package name.

In some embodiments, the target speed-boost indicator is set on an application-by-application basis. For example, the target speed-boost indicator can be set for an application individually (e.g., independent of the target speed-boost indicator setting of another application). In some embodiments, the target speed-boost indicator is set according to application type. One example is one or more applications installed on the terminal and having a particular type of application (e.g., a predefined type of application). Applications can be associated with one or more types of applications. The one or more types of applications with which a particular application is associated can be set by a user, an administrator, and/or a developer of the particular application. As an example, types of applications can comprise communication applications, email applications, instant messaging applications, word processing applications, gaming applications, media applications, video applications, weather applications, shopping applications, calendar applications, etc.

In some embodiments, target speed-boost applications comprise a list of pre-specified network speed-boost applications. For example, a combat game application and other applications can be included on a list of network speed-boost applications. The terminal can store the list of network speed-boost applications. The list of network speed-boost applications can be configured (e.g., modified, updated, etc.) by a user. For example, the user can modify the list of network speed-boost applications to add one or more applications that the user desires to be deemed target speed-boost applications. As another example, the user can modify the list of network speed-boost applications to delete one or more applications from the list of network speed-boost applications for one or more applications that the user no longer deems to be target speed-boost applications. The list of network speed-boost applications can be configured on an application-by-application basis. For example, the list of network speed-boost applications can be configured for an application individually (e.g., independent of another application). In some embodiments, the list of network speed-boost applications can be configured according to application type. One example is one or more applications installed on the terminal and having a particular type of application (e.g., a predefined type of application). Applications can be associated with one or more types of applications. The one or more types of applications with which a particular application is associated can be set by a user, an administrator, and/or a developer of the particular application. As an example, types of applications can comprise communication applications, email applications, instant messaging applications, word processing applications, gaming applications, media applications, video applications, weather applications, shopping applications, calendar applications, etc. In some embodiments, the system provides a list of applications installed on the terminal (e.g., a complete list of applications installed on the terminal), and a manager, an administrator, and/or the user selects which of the applications on the list of applications are to be deemed target speed-boost applications. The applications selected to be deemed target speed-boost applications can be identified as target-speed boost applications.

In some embodiments, the determining that a target speed-boost application is running in the foreground comprises obtaining an identifier associated with the application running in the foreground and querying the list of network speed-boost applications based at least in part on the identifier associated with the application running in the foreground. In response to determining that the list of network speed-boost applications comprises the application determined to be running in the foreground (or an identifier associated with the application determined to be running in the foreground), the terminal determines that a target speed-boost application is running the foreground.

In some embodiments, the determining that a target speed-boost application is running in the foreground comprises determining an application running in the foreground (e.g., obtaining an identifier associated with the application running in the foreground) and querying the mapping of applications to target speed-boost applications based at least in part on the application running in the foreground (or an identifier associated with the application determined to be running in the foreground). In response to determining that the mapping of applications to target speed-boost applications comprises the application determined to be running in the foreground (or an identifier associated with the application determined to be running in the foreground), the terminal determines that a target speed-boost is running in the foreground.

The determination of whether a target speed-boost application is running (e.g., in the foreground) can be made continuously, according to a preset time period, etc.

At 120, communication for one or more applications that are not within a set of applications is blocked. The set of applications can comprise one or more target speed-boost applications. In some embodiments, the set of applications comprises target speed-boost applications and one or more applications that are not target speed-boost applications.

In response to determining that a target speed-boost application is running in the foreground, the terminal uses a virtual private network (VPN) to block communications by applications other than target applications (e.g., one or more applications that are not within a set of applications). The target applications comprise at least the target speed-boost application running in the foreground. In some embodiments, the terminal invokes the VPN in response to determining that a target speed-boost application is running in the foreground. As an example, the invocation of the VPN comprises executing a networking application or process that configures and manages the VPN. As an example, the invocation of the VPN comprises providing information to an application or process associated with the VPN. For example, if an application or process associated with the VPN is running in the background when the terminal determines that the target speed-boost application is running, the terminal can provide an instruction to the application or process associated with the VPN to perform corresponding network traffic management (e.g., blocking communication for one or more applications that are not within a set of applications). Various embodiments use the VPN to block communications by applications other than target applications rather than directly blocking such applications by dropping connections for such applications because control of the net connection by the system may not be available or permitted.

According to various embodiments, the VPN is configured to selectively block communications from one or more applications. The VPN can block or throttle communication between the VPN and applications other than the target applications. For example, the VPN determines whether communication corresponds to communication with an application other than the target application based on an identifier included in the communication (e.g., an identifier included in the metadata or header of information being communicated). As an example, the identifier indicates the application with which the information is associated. As another example, the identifier indicates a type of application with which the information is associated.

In some embodiments, in response to determining that a target speed-boost is running (e.g., in the foreground), the terminal blocks communications for one or more applications that are not within a set of applications. The terminal can allocate additional network communication bandwidth to the target speed-boost application determined to be running in the foreground.

In some embodiments, blocking communication for the one or more applications comprises throttling communication for the one or more applications. For example, the terminal can restrict outgoing communication for the one or more applications, and permit incoming communication for the one or more applications. As another example, the terminal can restrict incoming communication for the one or more applications, and permit outgoing communication for the one or more applications. As another example, the terminal can set a threshold amount of network bandwidth that is to be allocated to the one or more applications. The threshold amount of a network bandwidth that is to be allocated to the one or more applications can be configured by the user (e.g., according to user preferences or user settings, etc.). In some embodiments, a threshold amount of a network bandwidth that is to be allocated to the one or more applications is configured on an application-by-application basis (e.g., for an application on an individual basis). In some embodiments, the threshold amount of a network bandwidth that is to be allocated to the one or more applications is configured on an application type-by-application type basis (e.g., the threshold amount of a network bandwidth can be set according to a type of application).

In some embodiments, the target applications comprise only a target speed-boost application. In response to determining that a target speed-boost application is running in the foreground, a VPN is used to block network communications by applications other than the target speed-boost application.

In some embodiments, the target applications comprise a target speed-boost application and one or more associated applications that are associated with the target speed-boost application. In response to determining a target speed-boost application is running in the foreground, a VPN can be used to block network communications by applications other than the target speed-boost application and the applications associated with the target speed-boost application. The association between the speed-boost application and the other applications can be set by the user or developer, or the association between the speed-boost application and the other applications can be determined according to inter-application calling relationships. For example, the terminal can store a mapping of associations between an application and one or more other applications.

One example is if the target speed-boost application is Application A. While Application A is running, Application A may jump over to and run Application B. The Application A can jump over to and run Application B based on a package name. Thus, Application B may be regarded as an application associated with Application A. If currently opened applications include Application A, Application B, Application D, and Application E, and if unopened applications are not conducting network communications, then Application A, while running in the foreground, can use a VPN to block network communications by Application D and Application E, with the result that Application A and Application B remain connected to the network while Application A is shielded from message notifications from Application D and Application E while Application A is running.

In some embodiments, all traffic arising from applications on the terminal is sent through the VPN, and the VPN selectively allows/blocks traffic.

In some embodiments, using a VPN to block network communications by applications other than the target application comprises: directing (e.g., causing) the target applications to use normal communication channels (e.g., unencrypted network channels provided by a physical network interface card) in connection with communicating over a network, and directing (e.g., causing) applications other than target applications to communicate via a VPN in connection with performing communications over a network. The terminal can direct (e.g., cause) the applications other than target applications to communicate via the VPN based on using an API (e.g., VpnService). The VPN can selectively and/or temporarily block (or throttle) communications between applications (specifically, applications other than the target applications) and the network. In response to determining that a target speed-boost application is no longer running in the foreground, the terminal can cause the applications other than the target applications to stop communicating via the VPN. As an example, if the terminal causes the applications other than the target applications to stop communicating the VPN, the applications other than the target applications can communicate via other means. For example in response to determining that a target speed-boost application is no longer running in the foreground, the terminal can direct network communications for all applications to use normal communication channels (network channels provided by a physical network interface card) in connection with communicating over a network. The terminal can stop the VPN, including exiting or closing an application or process associated with the VPN.

In some embodiments, using a VPN to block network communications by applications other than the target application comprises: directing the target applications to use network channels provided by a physical network interface card to conduct network communications; directing applications other than target applications to use network channels provided by a VPN virtual network interface card to conduct network communications, and temporarily blocking network channels provided by the VPN virtual network interface card.

In some embodiments, the terminal restores the network channels provided by the VPN virtual network interface card upon determining that the target speed-boost application has stopped running in the foreground. For example, in response to the target speed-boost application no longer running in the foreground, the network channels of applications other than the target applications are restored.

In some embodiments, setting or defining the target applications and the applications other than the target applications are configured by a user. For example, a user can set or define the target applications and the applications other than the target applications in advance of process 100. The user can pre-configure the target applications on a terminal device to conduct network communications using network channels provided by a physical network interface card and pre-configure applications other than the target applications to conduct network communications using network channels provided by a VPN virtual network interface card. Configuring the target applications or the applications other than the target applications can comprise configuring (e.g., modifying) the application package name. In response to the terminal device determining that the target speed-boost application is running in the foreground, the terminal obtains pre-configuration with respect to the target applications and/or the applications other than the target application, and based at least in part on the pre-configuration with respect to the target applications and/or the applications other than the target application, the terminal temporarily blocks the network communication provided by the VPN (e.g., block the network channels provided by the VPN virtual network interface card). For example, the terminal disconnects (e.g., from network communication) the applications other than the target applications. As another example, in response to determining that a target speed-boost application is running in the foreground, the terminal can prompt the user to select and confirm on a display interface which applications are to be blocked, obtain an input from the user corresponding to selection of applications to be blocked (e.g., for which network communication is to be blocked), and in response to selection of the applications to be blocked, cause the user-selected applications to communicate via the VPN in connection with network communications (e.g., cause the user-selected applications to use communication channels provided by a VPN virtual network interface card to conduct network communications). Communication via the VPN (e.g., the network channels provided by the VPN virtual network interface card) is temporarily blocked. For example, the communication via the VPN is blocked until the target speed-boost application is no longer running in the foreground.

A process according to which a VPN is used in connection with blocking network communication of relevant applications (e.g., applications other than the target application) is described in connection with FIG. 2.

Figure 2:
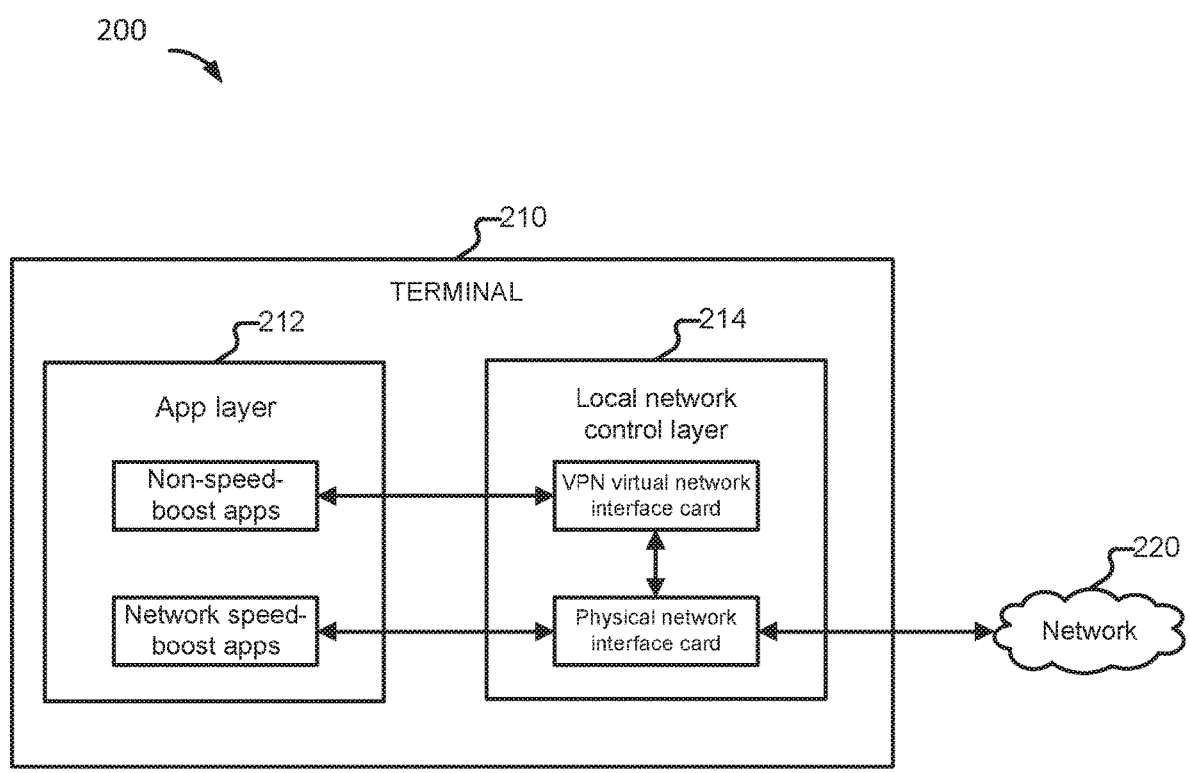
FIG. 2 is a diagram of a virtual private network (VPN) used to block network communications by relevant applications according to various embodiments of the present application.

FIG. 2 is a diagram of a virtual private network (VPN) used to block network communications by relevant applications according to various embodiments of the present application.

Referring to FIG. 2, system 200 for network control is provided. System 200 can be implemented in connection with process 100 of FIG. 1, process 300 of FIG. 3, process 400 of FIG. 4, and/or process 500 of FIG. 5. System 200 can be implemented at least in part by computer system 600 of FIG. 6.

As illustrated in FIG. 2, system 200 comprises terminal 210 and network 220. Terminal 210 can communicate with one or more network resources via network 220. For example, terminal 210 can communicate with one or more servers via network 220. Terminal 210 can communicate via network 220 in connection with obtaining one or more services (e.g., an Internet-based service), etc.

Terminal 210 stores applications 212. One or more applications of applications 212 can be executed on terminal 210. Terminal 210 can run one or more applications of applications 212 in the background, and can run one or more applications of applications 212 in the foreground. An application running in the foreground can correspond to an application for which an interface is being displayed on a screen or an application that the user of the terminal is actively engaging (e.g., via one or more inputs). An application running in the background can correspond to an application for which processes are being run for which an interface is not displayed on a screen or with which the user of the terminal is not actively engaging. In some embodiments, an application in the background does not provide a user interface, and an application in the foreground provides a user interface. Applications 212 on terminal 210 can be divided into two types of applications: network speed-boost applications and non-speed-boost applications.

In some embodiments, terminal 210 comprises an application layer 212 and a local network control layer 214. One or more applications running on terminal 210 can execute in the application layer 212. Local network control layer 214 can process communications between processes running on terminal 210 and communications between terminal 210 and network devices such as a server, a router, a telecommunications tower, etc. Local network control layer 214 can comprise a VPN virtual network interface card and a physical network interface card. The VPN virtual network interface card can be set up (e.g., implemented, invoked, or configured) based on a system using an API. The VPN virtual network interface card is configured to communicate with one or more applications in application layer 212. The VPN virtual network interface card is configured to route communications between the physical network interface card and one or more applications of the layer 212 that communicate via VPN (e.g., rather than directly with the physical network interface card). For example, the VPN virtual network interface card can route communication between the physical network interface card and non-speed-boost applications. The physical network interface card communicates with network 220. For example, the physical network interface card communicates information between application layer 212 and network 220. As another example, the physical network interface card communicates information between the non-speed boost applications and the network 220 via the VPN virtual network interface card.

In some embodiments, target speed-boost applications comprise a list of pre-specified network speed-boost applications. For example, a combat game application and other applications can be included on a list of pre-specified network speed-boost applications. Terminal 210 can store the list of network speed-boost applications (e.g., a list of pre-specified network speed-boost applications). The list of network speed-boost applications can be configured (e.g., modified, updated, etc.) by a user. For example, the user can modify the list of network speed-boost applications to add one or more applications that the user desires to be deemed target speed-boost applications. As another example, the user can modify the list of network speed-boost applications to delete one or more applications from the list of network speed-boost applications for one or more applications that the user no longer deems to be target speed-boost applications. The list of network speed-boost applications can be configured on an application-by-application basis. For example, the list of network speed-boost applications can be configured for an application individually (e.g., independent of another application). In some embodiments, the list of network speed-boost applications can be configured according to application type. For example, one or more applications installed on the terminal and having a particular type of application (e.g., a predefined type of application) can be configured according to the application type. Applications can be associated with one or more types of applications. The one or more types of applications with which a particular application is associated can be set by a user, an administrator, and/or a developer of the particular application. As an example, types of applications can comprise communication applications, email clients, instant messaging applications, word processing applications, gaming applications, media applications, video applications, weather applications, shopping applications, calendar applications, etc. The list of speed-boost applications can be managed according to an application package name for the applications to be deemed a speed-boost application. The VPN can operate according to (e.g., based on) the list of speed-boost applications. For example, the terminal (e.g., the VPN) can identify the applications for which the VPN is to be used based on the list of speed-boost applications.

The list of target speed-boost applications can be set up in advance and can be used to record information (e.g., application IDs, names, types, network communication bandwidth preferences or requirements, etc.) about applications for which network connection speeds are to be increased. For example, network speed-boost applications comprise: one or more combat game applications (e.g., Quake™, Call of Duty™, Halo™, Half-Life™, Mortal Kombat™, etc.), etc. As another example, network speed-boost applications comprise: one or more sport game applications (e.g., a basketball game, a soccer game, a football game, a hockey game, a tennis game, etc.). As another example, network speed-boost applications comprise: one or more video streamlining applications (e.g., Netflix™, Hulu™, etc.). Applications that are not stored in the list of target speed-boost applications can be deemed non-speed-boost applications. In some embodiments, a list of non-speed-boost applications is stored on the terminal. In some embodiments, the user can select applications that are to be deemed target speed-boost applications and applications that are to be deemed non-speed-boost applications. A target speed-boost application can correspond to a network speed-boost application.

A target speed-boost application performs network communication via a physical network interface card. A non-speed-boost application performs network communication via a VPN. For example, a non-speed-boost application can perform network communication via a VPN virtual network interface card. For example, the non-speed-boost applications perform network communication via a VPN that is not used by network speed-boost applications (e.g., for contemporaneous network communications). The speed-boost applications conduct network communications through a network channel provided by a physical network interface card (e.g., directly through the network channel provided by the physical network interface card), and a non-speed-boost application is configured (or caused) to conduct network communications using a network channel provided by a VPN virtual network interface card. Information (e.g., application identifier (ID) and application name) corresponding to the applications that are caused to communicate through a VPN virtual network interface card can be added to the VPN virtual network interface card configuration information. Adding the information corresponding to the applications that are caused to communicate through the VPN virtual network interface card provides information to the VPN and can configured the application. In some embodiments, traffic from non-speed boost applications is intercepted and directed through the VPN. As an example, the VPN can obtain traffic from non-speed boost applications based on an application package name.

In some embodiments, in response to determining that a target speed-boost application is running in the foreground, a non-speed-boost application is configured to communicate with a network via the VPN. For example, one or more settings of the non-speed-boost application is modified such that network communication for the non-speed-boost application is performed via communication with the VPN. If the one or more settings of the non-speed-boost application are modified such that network communication for the non-speed-boost application is performed via communication with the VPN, then the non-speed-boost application communicates via the VPN to obtain information from one or more network servers for providing a service corresponding to the non-speed-boost application. As an example, if a calendar application is deemed to be a non-speed-boost application, then in response to determining that a target speed-boost application is running in the foreground, the calendar application is configured to communicate with a server providing a service or information for the calendar application such that communication between the calendar application and the server is performed (e.g., routed) via the VPN. If the calendar application attempts to obtain information from the server, the request for information is communicated via the VPN.

In some embodiments, in response to determining that a target speed-boost application is running in the foreground, the terminal is configured to intercept network traffic for a non-speed-boost application (e.g., outgoing network traffic), and the intercepted network traffic is routed to the VPN. The VPN is used in connection with performing (or managing) network communication for the non-speed-boost application. The VPN can block or throttle communication for the non-speed-boost application, thereby making more bandwidth available to the speed-boost apps. For example, the terminal (e.g., an application for the VPN) can store a list of applications corresponding to non-speed-boost applications or applications for which the VPN is to perform network communication. In response to the VPN receiving information to be communicated, the VPN can obtain and/or query the list of applications corresponding to non-speed-boost applications or applications for which the VPN is to perform network communication, and the VPN can determine whether the VPN is to permit communication of the received information for the application corresponding to the received information, block communication of the received information for the application corresponding to the received information, and/or throttle communication of the received information for the application corresponding to the received application (e.g., based at least in part on a result of the query or on a determination that the application corresponding to the received information is a non-speed-boost application). As an example, if a calendar application is deemed to be a non-speed-boost application, then in response to determining that a target speed-boost application is running in the foreground, the terminal is configured to intercept between the non-speed-boost application (e.g., communication from the non-speed-boost application) and a server providing a service or information for the calendar application such that communication between the calendar application and the server is performed (e.g., routed) via the VPN. If the calendar application attempts to obtain information from the server, the request for information is communicated via the VPN. In some embodiments, network traffic for the non-speed-boost application is intercepted by an operating system of the terminal or a process running in the background of the terminal.

In some embodiments, in response to a determination that a target speed-boost application is running in the foreground, network channels provided by a VPN virtual network interface card are temporarily blocked. For example, the VPN virtual network interface card can be set so that the VPN temporarily stops operating and/or does not perform data transmission or processing. Thus, the non-speed-boost applications that conduct network communications through the VPN virtual network interface card are (effectively) disconnected from the network, and the network bandwidth can be allocated to the target speed-boost application and thereby achieve the objective of increased speed. For example, if the non-speed-boost applications that conduct network communications through the VPN virtual network interface card are (effectively) disconnected from the network, network bandwidth that would have been consumed (or required) by the non-speed-boost applications is now available for use by the target speed-boost application. Moreover, because the non-speed-boost applications are disconnected from the network, message notifications from the non-speed-boost applications are blocked while the target speed-boost application is running, and the user is thus provided with an uninterrupted experience of the target speed-boost application. For example, the non-speed-boost applications are disconnected from the network, and message notifications from the non-speed-boost applications are blocked while the target speed-boost application is running in the foreground. In some embodiments, the non-speed-boost applications are connected to the network in response to determining that a target speed-boost application is not running in the foreground (e.g., in response to determining that the target speed-boost application that was running in the foreground is no longer running in the foreground).

In some embodiments, if multiple target speed-boost applications are recorded in a list of target speed-boost applications and at least two target speed-boost applications (e.g., target speed-boost application A and target speed-boost application B) are on the list of target speed-boost applications, and if target speed-boost application A is running in the foreground and is to be shielded from interference by target speed-boost application B or requires additional network bandwidth (e.g., for more effective performance), target speed-boost application B can be configured to conduct network communications via a network channel provided by a VPN virtual network interface card, with the result that network speed-boost application B is disconnected from the network through blocking of the communication channel provided by the VPN virtual interface card. If target speed-boost application A is running in the foreground, and there exists an association between target speed-boost application B and target speed-boost application A, then both target speed-boost application A and target speed-boost application B can be configured to conduct network communications through network channels provided by a physical network interface card.

In some embodiments, a first target speed-boost application can be deemed a non-speed-boost application in certain contexts such that one or more second target speed-boost applications are allocated the network bandwidth otherwise occupied by the first target speed-boost application. For example, if a first target speed-boost application is running in the foreground, a second target speed-boost application can be deemed a non-speed-boost application to enable the first target speed-boost application to use network bandwidth that would otherwise be used by the second target speed-boost application. The second target speed-boost application can be configured (or network traffic can be intercepted and directed) such that communication between the second target speed-boost application and a network is via the VPN. In some embodiments, a list of non-speed-boost applications and/or a list of target speed-boost applications can be configured according to a context or an application.

In some embodiments, mappings of applications to target speed-boost applications is stored (e.g., on the terminal). The target speed-boost applications mapped to a particular application can correspond to one or more applications that are to be deemed target speed-boost applications in the event that the particular application is running in the foreground. As an example, applications that are not mapped to a particular application as target speed-boost applications can be deemed to be non-speed-boost applications in the event that the particular application is running in the foreground. In some embodiments, one or more applications are deemed target speed-boost applications irrespective of which particular application is running in the foreground and/or irrespective of whether such one or more applications are mapped to the particular application as target speed-boost applications.

In some embodiments, mappings of applications to non-speed-boost applications are stored (e.g., on the terminal). The non-speed-boost applications mapped to a particular application can correspond to one or more applications that are to be deemed non-speed-boost applications in the event that the particular application is running in the foreground. As an example, applications that are mapped to a particular application as non-speed-boost applications can be deemed to be non-speed-boost applications in the event that the particular application is running in the foreground. In some embodiments, one or more applications are deemed target speed-boost applications irrespective of which particular application is running in the foreground and/or irrespective of whether such one or more applications are mapped to the particular application as non-speed-boost applications.

Terminal 210 can determine Internet access paths depending on whether the current wireless network (e.g., a public WiFi network) involves risk. For example, if the currently connected WiFi network is assessed as risky (e.g., based on one or more risk assessment criteria), network access is performed via the VPN (e.g., a VPN server). If the currently connected WiFi network is assessed as having no or low risk, the network can be accessed directly through a router path.

In some embodiments, in response to determining that a target speed-boost application is running in the foreground, telephone calls and short messages (e.g., text messages) are intercepted. Telephone calls and text messages can be intercepted based on whether a sender associated with the telephone call or the text message is included on a preset interception list. For example, in response to receiving a telephone call or text message, the terminal queries an interception list to determine whether a sender of the telephone call or the text message is included in the interception list. The querying of the interception list to determine whether a sender of the telephone call or the text message is included therein can comprise querying the interception list to determine whether a number associated with the sender is recorded in an interception list. In some embodiments, instant messages are intercepted in a manner similar to the telephone calls and short messages described herein. As an example, instant messages for one or more predefined applications can be intercepted. As another example, instant messages for one more predefined applications can be permitted to be delivered. In some embodiments, telephone calls and short messages (e.g., text messages) are intercepted if an interception setting is set to intercept telephone calls and/or text messages based on user settings or configurations. In some embodiments, the interception list is configurable. For example, the interception list can be configured by a user (e.g., based on user selection and/or user settings).

In some embodiments, an element can be displayed in response to interception of a telephone call and/or an instant message. As an example, the element corresponds to an indication that a telephone call and/or a text message is intercepted. The element can comprise information associated with the intercepted telephone call and/or text message.

For example, the element comprises one or more of sender information, a time the intercepted telephone call and/or text message was received, a link to return a telephone call and/or text message to the sender, a link to send a preset message to the sender, a link to launch a telephone application and/or a messaging application, etc. The intercepted telephone call and/or short message information can be displayed in the form of a floating window in a display interface.

In some embodiments, numbers to be intercepted (e.g., when a target application is determined to be running in the foreground) are recorded in the interception list.

In some embodiments, the floating window (e.g., that comprises information associated with an intercepted call and/or text message) is semi-transparent. The floating window can be displayed as an overlay over the target application running in the foreground. Intercepted calls and/or text messages (or information associated therewith) are displayed in the form of a floating window on a display interface. The display in the form of the floating window can reduce an effect on current operations of the user on the terminal device, thereby allowing the user to be aware of intercepted calls and short messages in real time and thus to avoid missing important matters. The floating window can automatically disappear after being displayed for a predetermined length of time, or the floating window can disappear after receiving an appropriate operation by the user (e.g., clicking on the floating window, clicking outside the floating window, or flipping over or shaking the terminal device).

In some embodiments, a white list of numbers could be set up in advance. In this case, calls and short messages from numbers not on the white list could be intercepted when a target speed-boost application has been detected running in the foreground. In some embodiments, terminals store a white list comprising information associated with senders for which a telephone call and/or a text message (or another predefined form of communication) is delivered irrespective of whether a telephone application, text messaging application, email client, etc. is deemed a non-speed-boost application when a target application (e.g., a particular target application, or any application deemed to be a target application) is running in the foreground.

Figure 3:
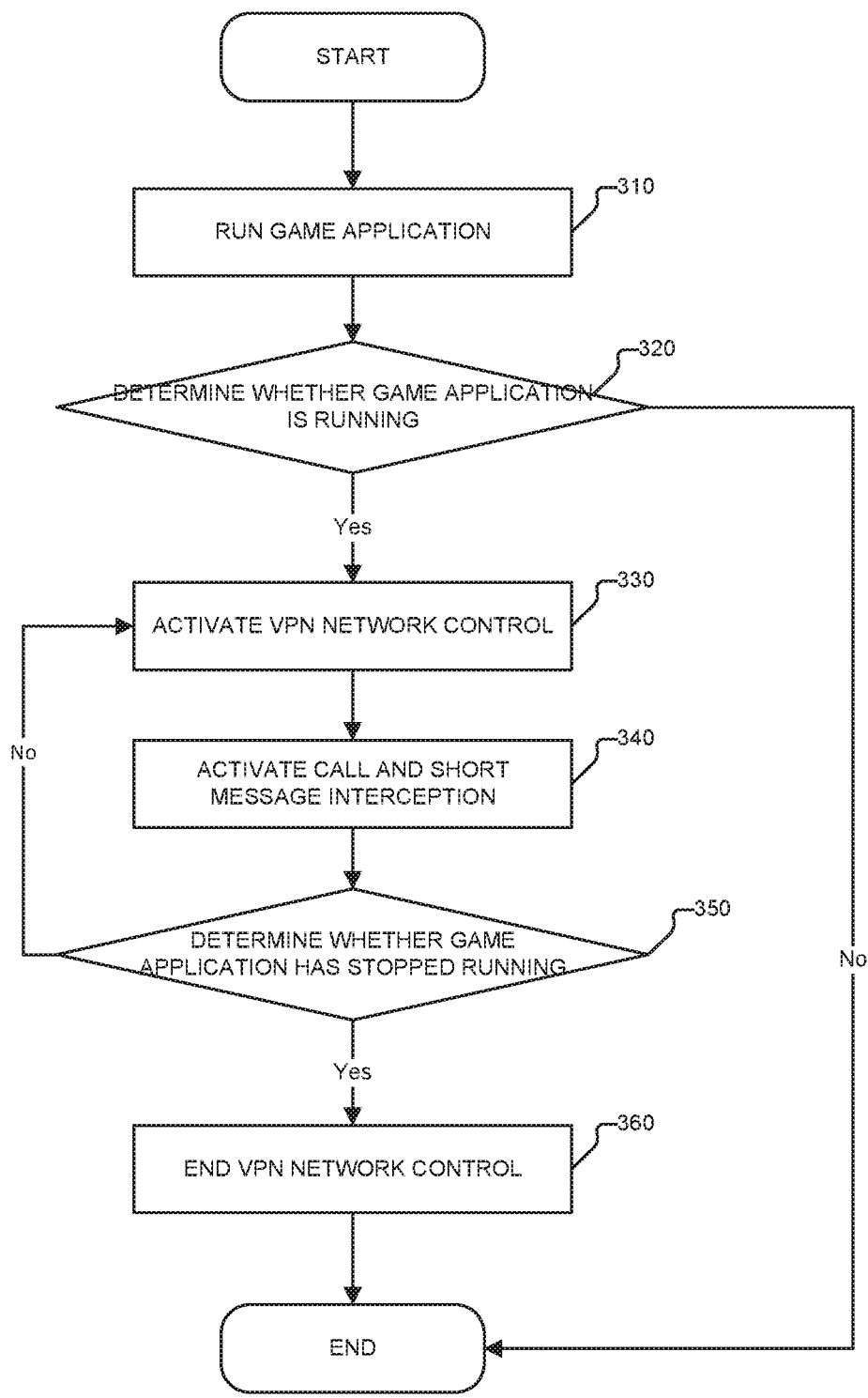
FIG. 3 is a flowchart of a method for network control according to various embodiments of the present application.

FIG. 3 is a flowchart of a method for network control according to various embodiments of the present application.

Referring to FIG. 3, process 300 for network control is provided. Process 300 can be implemented in connection with virtual private network (VPN) 200 of FIG. 2. Process 300 can be implemented in connection with process 100 of FIG. 1, process 400 of FIG. 4, and/or process 500 of FIG. 5. Process 300 can be implemented by computer system 600 of FIG. 6.

At 310, a target application (in this case, a game application) is executed on a terminal. The game application can be executed in response to a user selecting to open the game application.

At 320, the terminal determines whether a game application is running. In some embodiments, the terminal determines whether the game application is running in the foreground of the terminal. An application or process running on an operating system of the terminal can determine whether a game application is running in the foreground.

In response to determining that a game application is not running at 320, process 300 can end. For example, in response to determining that the game application is not running in the foreground, process 300 can end.

In response to determining that a game application is running at 320, process 300 proceeds to 330. For example, in response to determining that the game application is running in the foreground, process 300 proceeds to 330.

At 330 a VPN network control is activated. The terminal can activate (e.g., invoke or send information to the VPN to initiate a VPN network control) in response to determining that the game application is running in the foreground.

As an example, the terminal can use a VPN to block the network connections of open applications other than the current game application, with the result that the current game application can use the available network bandwidth for itself. Thus, the network connection speed for the game application is increased and the objective of boosting the speed of the game is achieved.

As an example, the terminal device prompts the user to confirm which applications are to have network connections blocked. In response to a user selecting one or more applications to be subject to network connection blocking, the terminal device can cause the one or more user-selected applications to communicate with a network via the VPN. The terminal directs (or causes) the user-selected applications to use network channels provided by a VPN virtual network interface card to conduct network communications. The terminal can temporarily block network channels provided by the VPN virtual network interface card. The user-selected applications can be opened applications (e.g., applications running in the background, etc.), or the applications can be temporarily unopened applications. Blocking network communication for one or more applications (e.g., the one or more user-selected applications) protects the network connection speed of the game application from the effects of starting other applications while the game application is running or from the effects of one or more user-selected applications performing network communication (e.g., in the background) and consuming network bandwidth.

If an application is subject to a blocking of network communications, the application cannot conduct network communications (e.g., while disconnected from the network), and the application will not communicate message notifications. The user is thus not subject to annoyances while interacting with the gaming application (e.g., that is running in the foreground) and thus is provided with a pure entertainment experience.

At 340, interception of telephone calls and messaging (e.g., short messages or text messages) is activated. As an example, the terminal activates the interception of telephone calls and messaging in response to determining that the gaming application is running in the foreground. Thus, when the game application is running in the foreground, interception of calls and short messages is activated. The activation of interception of calls and/or short messages can be based on an API (e.g., an API being invoked or being used to communicate information) provided by the system. In response to the interception of telephone calls and messaging being activated, telephone calls and messages received or sent by the terminal are intercepted. Intercepting the telephone calls and/or messages can be performed according to an interception list. As an example, the user can set up an interception list to intercept calls and/or short messages from numbers (or senders) on the interception list. As a result, the user performs gaming operations without interruptions caused by telephone calls and/or messages. The user is provided with an immersion-type gaming experience. In some embodiments, a notification of the interception of a telephone call and/or message is provided (e.g., displayed to the user). In some embodiments, information associated with an intercepted telephone call and/or message is provided (e.g., to the user). The notification or information associated with the intercepted telephone call and/or message can be displayed in a floating window on the user interface. For example, an alert in the form of a floating window can be provided to a user playing a game after a call or a short message has been intercepted. Providing an alert or notification of the interception of a telephone call and/or message enables the user to respond to the intercepted telephone call and/or message afterwards and not to miss important matters.

At 350, the terminal determines whether the game application has stopped running. In some embodiments, the terminal determines whether the game application is running (or has stopped running) in the foreground of the terminal. An application or process running on an operating system of the terminal can determine whether a game application is running in the foreground. The terminal can detect when the game application has stopped running in the foreground. For example, in response to a user switching a foreground application or closing the gaming application, the terminal can detect that the game application has stopped running in the foreground.

In response to determining that the game application has not stopped running (or that a game application is running, or not in the foreground) at 350, process 300 returns to 330. In some embodiments, upon returning to 330, the terminal maintains the VPN until the terminal determines to end the VPN (e.g., in response to determining that the game application has stopped running or is switched from the foreground). For example, the VPN does not need to re-invoke the VPN in response to determining that the game application has not stopped running. In some embodiments, in response to determining that the game application has not stopped running (or that a game application is running) at 350, the terminal iteratively performs 350 until the terminal determines that the game application has stopped running (or that a game application is not running in the foreground). For example, the terminal can continue to perform VPN network control while the game application is running in the foreground.

In response to determining that the game application has stopped running (or that a game application is not running) at 350, process 300 proceeds to 360.

At 350, VPN network control is stopped. The terminal can stop performing VPN network control in response to determining that the game application has stopped running (or that a game application is not running). As an example, if the VPN network control is stopped, the one or more applications that were subject to VPN network control while the VPN network control was active are no longer subject to VPN network control. In response to stopping the VPN network control, the network channels through which the one or more applications communicate with a network are restored. For example, the terminal restores the network channels provided by the VPN virtual network interface card. In some embodiments, if the VPN is stopped, the channels provided by the VPN are stopped.

Figure 4:
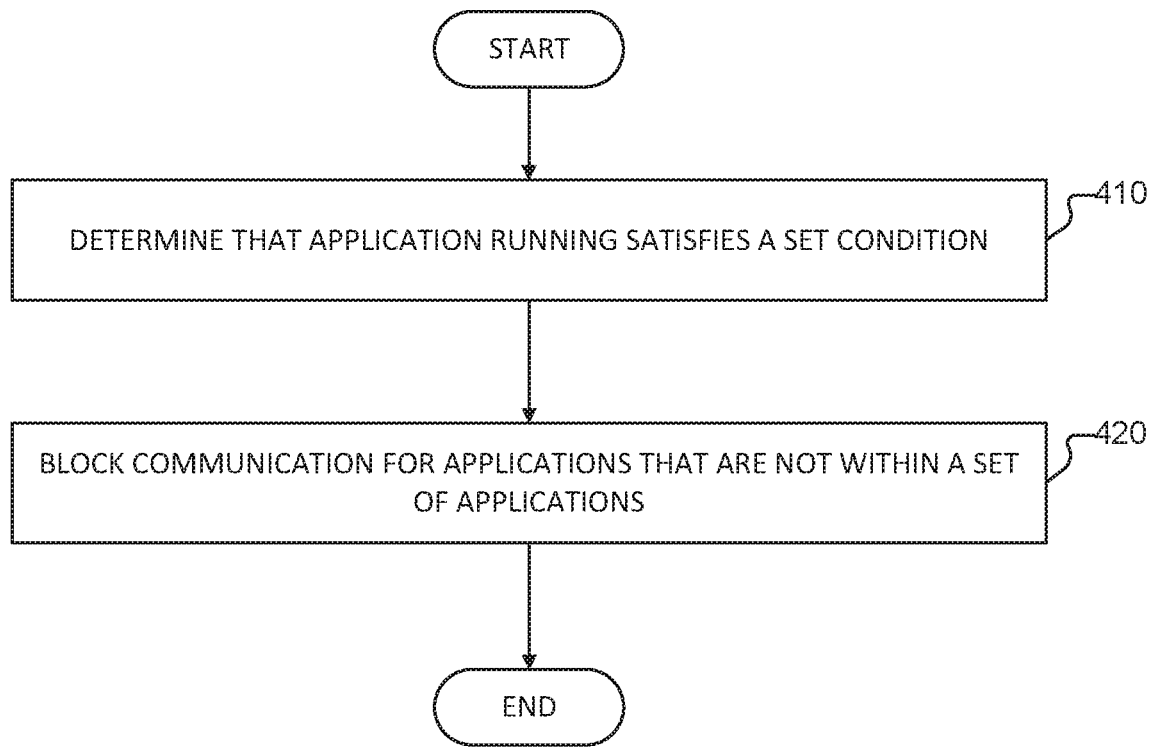
FIG. 4 is a flowchart of a method for network control according to various embodiments of the present application.

FIG. 4 is a flowchart of a method for network control according to various embodiments of the present application.

Referring to FIG. 4, process 400 for network control is provided. Process 400 can be implemented in connection with virtual private network (VPN) 200 of FIG. 2. Process 400 can be implemented in connection with process 100 of FIG. 1, process 300 of FIG. 3, and/or process 500 of FIG. 5. Process 400 can be implemented by computer system 600 of FIG. 6.

At 410, a terminal determines that an application (e.g., a target application) that is running satisfies one or more set conditions. For example, the terminal determines whether an application running in the foreground satisfies a set condition. The one or more set conditions can be configurable. For example, the set condition is configurable by a user according to user input, user preferences, and/or user settings. The one or more set conditions can comprise one or more of the application being a particular type of application, the application being a particular application, the application having an identifier matching a predefined identifier, the application consuming a threshold amount of network bandwidth, the application having a minimum threshold of network bandwidth requirements, etc.

At 420, in response to determining that the application that is running satisfies the one or more set conditions, communication for other applications that are not within a set of applications is blocked (or throttled). For example, communication for applications that correspond to non-speed-boost applications is blocked. The set of applications can comprise one or more target speed-boost applications. In some embodiments, the set of applications comprises target speed-boost applications and one or more applications that are not target speed-boost applications.

In response to determining that an application satisfies one or more set conditions, the terminal uses a virtual private network (VPN) to block communications by applications other than target applications (e.g., one or more applications that are not within a set of applications). The target applications comprise at least target speed-boost applications running in the foreground. In some embodiments, the terminal invokes the VPN in response to determining that the application running satisfies the one or more set conditions. As an example, the invocation of the VPN comprises executing an application or process associated with the VPN. As an example, the invocation of the VPN comprises providing information to an application or process associated with the VPN. For example, if an application or process associated with the VPN is running in the background when the terminal determines that the application running satisfies the one or more set conditions, the terminal can provide an instruction to the application or process associated with the VPN to perform corresponding network traffic management (e.g., blocking communication for one or more applications that are not within a set of applications).

In some embodiments, blocking communication for the one or more applications comprises throttling communication for the one or more applications. For example, the terminal can restrict outgoing communication for the one or more applications, and permit incoming communication for the one or more applications. As another example, the terminal can restrict incoming communication for the one or more applications, and permit outgoing communication for the one or more applications. As another example, the terminal can set a threshold amount of network bandwidth that is to be allocated to the one or more applications. For example, a VPI (e.g., the VPI corresponding to VpnService) can be used to set a threshold amount of network bandwidth that is to be allocated to the one or more applications. The threshold amount of a network bandwidth that is to be allocated to the one or more applications can be configured by the user (e.g., according to user preferences or user settings, etc.). The threshold amount of a network bandwidth that is to be allocated to the one or more applications can be configured on an application-by-application basis (e.g., for an application on an individual basis). The threshold amount of a network bandwidth that is to be allocated to the one or more applications can be configured on an application type-by-application type basis (e.g., the threshold amount of a network bandwidth can be set according to a type of application).

In response to detecting that the application running in the foreground satisfies a set condition, the terminal uses a VPN to block network communications by applications other than target applications. The target applications at least comprise the application running in the foreground.

The "application running in the foreground" refers to the application that the user is operating on the terminal device.

In some embodiments, the determining that the application running satisfies the one or more set conditions comprises determining (e.g., detecting) that the application running in the foreground is recorded in a list of pre-specified network speed-boost applications.

In some embodiments, the determining that the application running satisfies the one or more set conditions comprises determining (e.g., detecting) that the historical data flow consumed by the application running in the foreground satisfies a first condition (e.g., a threshold data consumption).

In some embodiments, the determining that the application running satisfies the one or more set conditions comprises determining (e.g., detecting) that the length of the historical operating time of the application running in the foreground satisfies a second condition.

The use of the first condition enables the terminal to screen for applications having greater data flow consumption. The use of the second condition enables the terminal to screen for applications with longer operating times. For example, the first condition could comprise: greater than or equal to a first threshold value. The second condition could comprise: greater than or equal to a second threshold value. The first condition and/or the second condition may be set according to actual situations.

In some embodiments, if the target applications comprise only an application running in the foreground, and in response to the terminal determining that an application running in the foreground satisfies a set condition, a VPN is used to block network communications by applications other than the application running in the foreground.

In some embodiments, the target applications comprise an application running in the foreground and applications recorded in a list of speed-boost applications. In other words, in response to the terminal determining that an application running in the foreground satisfies a set condition, a VPN can be used to block network communications by applications other than applications in a list of pre-specified network speed-boost applications. For example, an application running in the foreground is Application A, and Application A, Application B, and Application C are recorded in a list of pre-specified network speed-boost applications. If the opened applications include Application A, Application B, Application D, and Application E, then a VPN can be used to block network communications by Application B, Application D, and Application E, with the result that Application A can have the entire available bandwidth to itself. As another example, a VPN can used to block network communications by Application D and Application E only, with the result that Application A and Application B share the bandwidth and Application D and Application E are prevented from interfering with the use of Application A.

In some embodiments, the target applications comprise: an application running in the foreground and applications associated with the application running in the foreground. As an example, the applications associated with the application running in the foreground are determined according to information set up by the user. As another example, the applications associated with the application running in the foreground could be determined according to inter-application call relationships.

In some embodiments, using a VPN to block network communications by applications other than the target application comprises directing the target applications to use network channels provided by a physical network interface card to conduct network communications. For example, if an application running in the foreground does not satisfy the one or more conditions, then all applications perform network communication via the VPN. As another example, if an application running in the foreground does not satisfy the one or more conditions, then one or more of the target applications perform network communication via the VPN.

In some embodiments, using a VPN to block network communications by applications other than the target application comprises directing applications other than target applications to use network channels provided by a VPN virtual network interface card to conduct network communications, and temporarily blocking network channels provided by the VPN virtual network interface card.

In some embodiments, the terminal restores the network channels provided by the VPN virtual network interface card in response to determining (e.g., upon detecting) that the application that satisfies a set condition has stopped running in the foreground (or no longer satisfies the set condition).

In some embodiments, the terminal intercepts calls and short messages (e.g., texts) when the application running satisfies the one or more set conditions. In some embodiments, the terminal intercepts calls and short messages (e.g., texts) when the communication (e.g., network communication) for the applications that are not within the set of applications is blocked.

Figure 5:
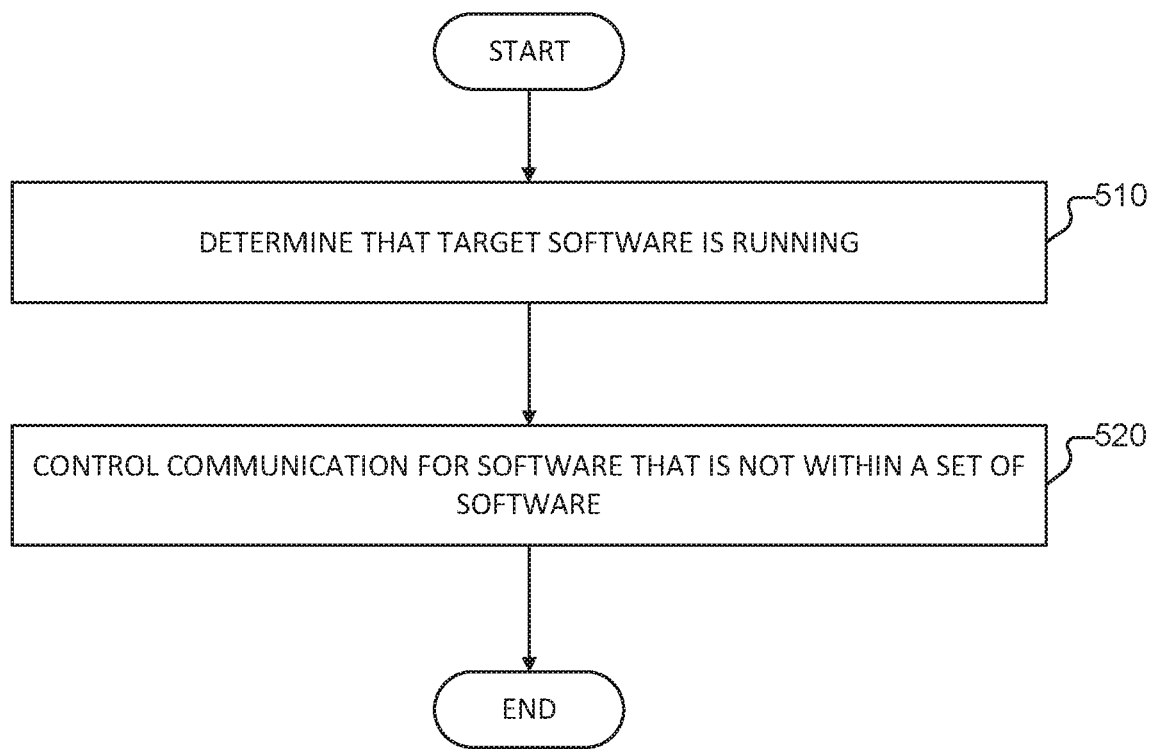
FIG. 5 is a flowchart of a method for network control according to various embodiments of the present application.

FIG. 5 is a flowchart of a method for network control according to various embodiments of the present application.

Referring to FIG. 5, process 500 for network control is provided. Process 500 can be implemented in connection with virtual private network (VPN) 200 of FIG. 2. Process 500 can be implemented in connection with process 100 of FIG. 1, process 300 of FIG. 3, and/or process 400 of FIG. 4. Process 100 can be implemented by computer system 600 of FIG. 6.

At 510, a terminal determines whether a target software is running. In some embodiments, the terminal determines whether a target software is running in the foreground. The operating system of the terminal can determine the one or more software running on the terminal (e.g., based on an API that can determine applications running in the foreground, etc.). The operating system of the terminal can determine whether software is a target software In some embodiments, a target software corresponds to an application that requires a large amount of network communication bandwidth in order to provide a certain Quality of Service to a user thereof. For example, a target software can consume a network communication bandwidth that exceeds one or more predefined thresholds. As another example, a target software can have a minimum targeted network communication bandwidth associated therewith. The minimum targeted network communication bandwidth can correspond to network communication bandwidth with which the corresponding target software will operate as desired. For example, the minimum targeted network communication bandwidth can be configured according to user settings or preferences. As another example, the minimum targeted network communication bandwidth can be pre-defined by a developer of the software.

In some embodiments, a terminal stores a mapping of software to target software. The mapping of applications to target software can identify applications installed on the terminal that correspond to target software. As an example, the mapping of software to target software can be configured by a user (e.g., according to user preferences or user settings). As another example, the mapping of software to target software can be configured based on an indicator associated with a software installed on the terminal. The indicator can also be referred to herein as the target speed-boost indicator. The indicator can be set according to whether the corresponding application is a target software. As an example, the indicator can be set by the user (e.g., according to user preferences or user settings). As another example, the indicator can be set by the developer of the software.

In some embodiments, the target speed-boost indicator is set on a software-by-software basis. For example, the target speed-boost indicator can be set for a software individually (e.g., independent of the target speed-boost indicator setting of another software). In some embodiments, the target speed-boost indicator is set according to software type. An example is one or more software installed on the terminal and having a particular type of software (e.g., a predefined type of software). Software can be associated with one or more types of software. The one or more types of software with which a particular software is associated can be set by a user, an administrator, and/or a developer of the particular software.

At 520, communication for software that is not within a set of software is controlled. For example, the network communication status of software other than the target software can be controlled according to a preset rule. The network communication status can comprise network communication speed or network communication switches.

In some embodiments, in response to determining that target software is running, the terminal invokes control of the communication for software that is not within a set of software that is controlled. For example, in response to determining that target software is running, the terminal invokes control of communication for non-speed-boost software or software that is not target software, or software that is not otherwise set to be exempted from control of communication thereof.

In some embodiments, the preset rule comprises: control the network communication status of software other than the target software when the target software is running in the foreground. As an example, a preset rule comprises: control the network communication status of software other than the target software when (e.g., in response to determining that) the target software has been running for a length of time greater than or equal to a duration threshold value. As an example, a preset rule comprises: control the network communication status of software other than the target software when (e.g., in response to determining that) the data flow consumed by the target software is greater than or equal to a data flow threshold value.

In some embodiments, controlling the network communication status of software other than the target software comprises using a VPN to control the network communication status of software other than the target software. For example, the VPN can be used to control network communication switches for software other than the target software (e.g., the target speed-boost application described above in connection with FIG. 1). A description of a manner by which a VPN is used to control network communication or network communication switches is described above.

In some embodiments, controlling communication for software other than the target software comprises controlling the network communication speed of software other than the target software (e.g., to reduce or lower the network bandwidth occupied by software other than the target software) so as to ensure smooth running by the target software.

Figure 6:
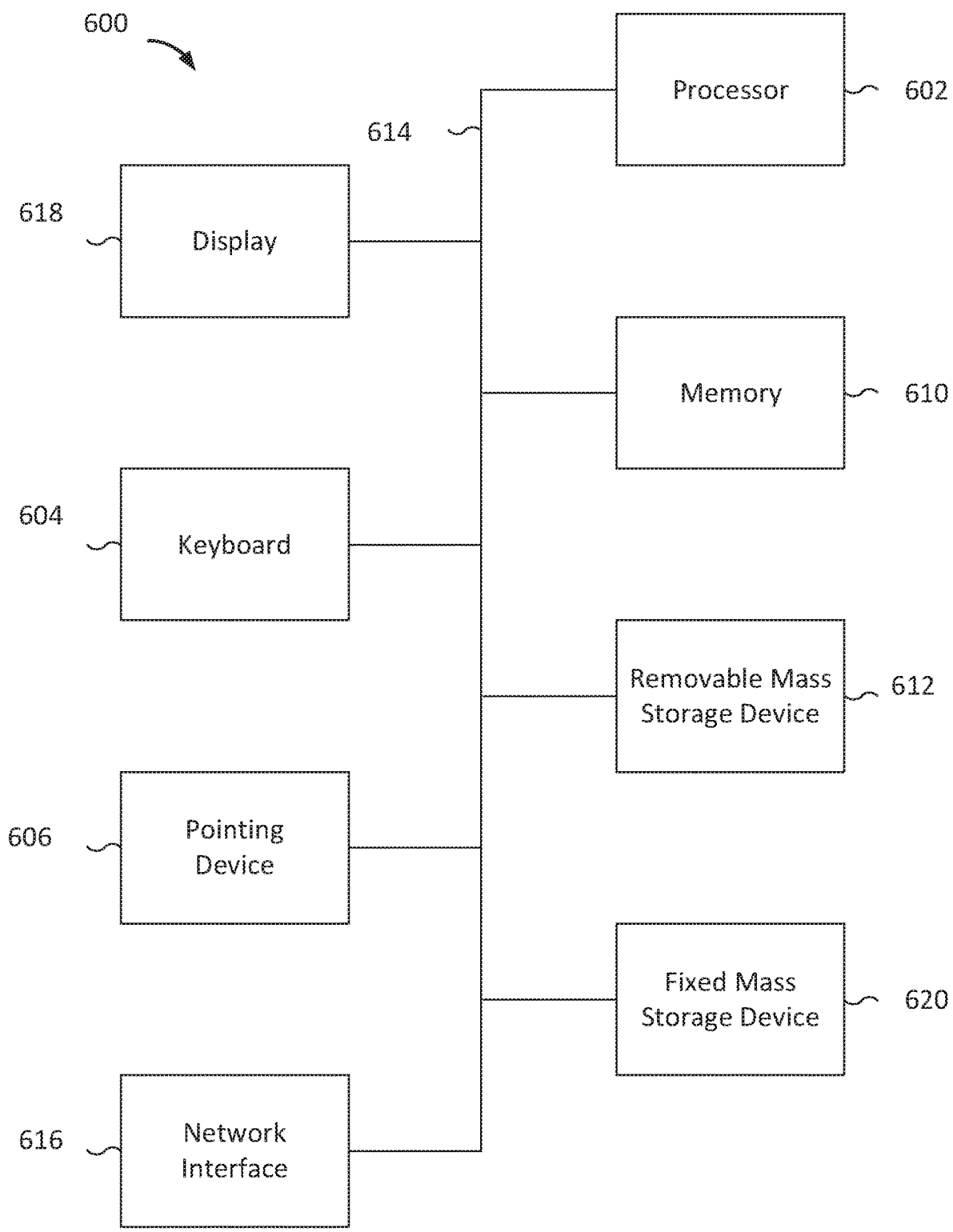
FIG. 6 is a functional diagram of a computer system for performing network control according to various embodiments of the present disclosure.

FIG. 6 is a functional diagram of a computer system for performing network control according to various embodiments of the present disclosure.

Referring to FIG. 6, computer system 600 is provided. Computer system 600 be implemented in connection with virtual private network (VPN) 200 of FIG. 2. Computer system 600 can implement at least part of process 100 of FIG. 1, process 300 of FIG. 3, process 400 of FIG. 4, and/or process 500 of FIG. 5.

Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown). The memory can be a non-transitory computer-readable storage medium.

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

A person of ordinary skill in the art can understand that all or some of the method steps, the systems, and the functional modules/units in the means that are disclosed above may be implemented as software, firmware, hardware, and appropriate combinations thereof. In hardware implementations, the partitions between the functional modules/units mentioned in the descriptions above do not necessarily correspond to physical component partitions. For example, a physical component may have multiple functions, or one function or step may be executed jointly by a number of physical components. Some components or all components may be implemented as software executed by a processor, such as a digital signal processor or a microprocessor or may be implemented as hardware or may be implemented as an integrated circuit, such as an application-specific integrated circuit. Such software can be distributed across computer-readable media. Computer-readable media may comprise computer storage media (or non-transitory media) and communication media (or transitory media). As is common knowledge to persons of ordinary skill in the art, the term "computer storage media" includes volatile and non-volatile and removable and non-removable media implemented in any method or technology for storage of information (such as computer-readable instructions, data structures, program modules, or other data). Computer storage media includes, but is not limited to, RAM, ROM, EEPROM, flash memory or other memory technologies, CD-ROM, digital versatile disks (DVDs) or other optical disk storage, magnetic cassettes, magnetic tapes, magnetic disk storage or other magnetic storage devices, or any other media that can be used to store desired information and that can be accessed by a computer. In addition, it is common knowledge to persons with ordinary skill in the art that communication media generally contains computer-readable instructions, data structures, program modules, or other data such as in carrier waves or modulated signal data of other types of transmission mechanisms and that can include any information-conveying media.

The above shows and describes the basic principles and main features of the present application, as well as the advantages of the present application. The present application is not restricted by the embodiments described above. The above embodiments and the descriptions in the specification merely explain the principles of the present application. There may also be various modifications and improvements to the present application, which, so long as they do not depart from the spirit and scope of the present application, fall without exception within the limits of protection claimed by the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, by one or more processors, whether a target application is running in a foreground of a terminal, the target application being included in a set of target applications wherein the set of target applications is determined based at least in part on querying a mapping of applications to target speed-boost applications for one or more target speed-boost applications corresponding to the target application; and
   in response to determining that the target application is running in the foreground, blocking or throttling, by the one or more processors, network communication for at least one application not included in the set of target applications.

2. The method of claim 1, wherein the set of target applications further comprises: applications associated with the target application.

3. The method of claim 1, wherein the set of target applications correspond to one or more applications that are installed on the terminal.

4. The method of claim 1, wherein the set of target applications is determined based at least in part on querying a list of network speed-boost applications.

5. The method of claim 1, wherein the set of target applications is determined based at least in part on one or more of a determined quality of service associated with the target application, a selection input by a user, and a type of application.

6. The method of claim 1, wherein the blocking the network communication for the at least one application not included the set of target applications comprises using a virtual private network (VPN) in connection with the blocking the network communication.

7. The method of claim 6, wherein the VPN runs on a local network control layer of the terminal.

8. The method of claim 6, further comprising: in response to determining that the target application is running in the foreground, invoking the VPN.

9. The method of claim 6, wherein the using the VPN in connection with the blocking the network communication for the at least one application not included in the set of target applications comprises:
  directing the set of target applications to use network channels provided by a physical network interface card to conduct network communications; and
  directing the at least one application not included in the set of target applications to use network channels provided by the VPN to conduct network communications, and temporarily blocking network channels provided by a VPN virtual network interface card corresponding to the VPN.

10. The method of claim 9, wherein the using the VPN in connection with the blocking the network communication comprises temporarily blocking network channels provided by the VPN virtual network interface card.

11. The method of claim 9, further comprising:
  restoring the network channels provided by the VPN virtual network interface card in response to determining that the target application has stopped running in the foreground.

12. The method of claim 1, further comprising:
  determining that the target application is no longer running in the foreground; and
  in response to determining that the target application is not running in the foreground, stopping the blocking of the network communication for the at least one application not included in the set of target applications.

13. The method of claim 1, further comprising:
  in response to the blocking of the network communication for the at least one application not included in the set of target applications, allocating network bandwidth to the set of target applications.

14. The method of claim 13, wherein the network bandwidth allocated to the set of target applications comprises additional bandwidth that is made available in connection with the blocking of the network communication for the at least one application not included in the set of target applications.

15. The method of claim 1, further comprising:
  in response to determining that the target application is running in the foreground, intercepting telephone calls and short messages based at least in part on an interception list; and
  displaying information of the intercepted telephone calls and short messages in a form of a floating window in a display interface.

16. The method of claim 15, further comprising:
  in response to intercepting a first telephone call or a first short message, displaying information associated with the intercepting of the first telephone call or the first short message,
  wherein the information associated with the intercepting of the first telephone call or the first short message is displayed in a floating window in a display interface.

17. A terminal, comprising:
  one or more processors configured to:
    determine whether a target application is running in a foreground of a terminal, the target application being included in a set of target applications, wherein the set of target applications is determined based at least in part on querying a mapping of applications to target speed-boost applications for one or more target speed-boost applications corresponding to the target application; and
    in response to determining that the target application is running in the foreground, block or throttle network communication for at least one application not included in the set of target applications; and
  one or more memories coupled to the one or more processors, configured to provide the one or more processors with instructions.

18. A computer program product, the computer program product being embodied in a non-transitory computer readable storage medium and comprising computer instructions for:
  determining, by one or more processors, whether a target application is running in a foreground of a terminal, the target application being included in a set of target applications, wherein the set of target applications is determined based at least in part on querying a mapping of applications to target speed-boost applications for one or more target speed-boost applications corresponding to the target application; and
  in response to determining that the target application is running in the foreground, blocking or throttling, by the one or more processors, network communication for at least one application not included in the set of target applications.

* * * * *